United States Patent [19]

Robbins et al.

[11] Patent Number: 5,796,423
[45] Date of Patent: Aug. 18, 1998

[54] SYSTEM FOR INTEGRATING DIGITAL AUDIO AND ANALOG VIDEO TO PROVIDE SEAMLESS USER TRANSPARENT FEATURES

[75] Inventors: Clyde Robbins, Maple Glen; John F. Maraska, Abington; John Kamieniecki, Lafayette Hill; Douglas W. Palmer, W. Norriton; Tony Nasuti, Norristown, all of Pa.

[73] Assignee: General Instrument Corporation, Horsham, Pa.

[21] Appl. No.: 502,517

[22] Filed: Jul. 14, 1995

[51] Int. Cl.⁶ .................................................. H04N 7/16
[52] U.S. Cl. .......................... 348/10; 348/729; 455/6.2; 455/6.3
[58] Field of Search .................... 348/10, 11, 8, 348/9, 6, 7, 12, 13, 731, 729, 732; 455/6.2, 6.3, 6.1, 4.2, 4.1, 5.1, 3.2, 186.1, 186.2; 381/2, 3, 4; 375/216, 260

[56] References Cited

U.S. PATENT DOCUMENTS

| | | | |
|---|---|---|---|
| 4,698,670 | 10/1987 | Matty | 455/6.3 |
| 4,862,268 | 8/1989 | Campbell et al. | 358/141 |
| 4,963,995 | 10/1990 | Lang | 358/335 |
| 5,111,287 | 5/1992 | Citta et al. | 358/83 |
| 5,134,719 | 7/1992 | Mankovitz | 455/186.1 |
| 5,202,761 | 4/1993 | Cooper | 358/149 |
| 5,220,420 | 6/1993 | Hoarty et al. | 358/86 |
| 5,220,602 | 6/1993 | Robbins et al. | 380/20 |
| 5,237,610 | 8/1993 | Gammie et al. | 380/10 |
| 5,239,540 | 8/1993 | Rovira et al. | 370/77 |
| 5,355,162 | 10/1994 | Yazolino et al. | 348/11 |
| 5,416,526 | 5/1995 | Yamamoto | 455/6.3 |
| 5,418,559 | 5/1995 | Blahut | 348/10 |
| 5,485,221 | 1/1996 | Banker et al. | 348/731 |
| 5,532,760 | 7/1996 | Inoue | 348/729 |

*Primary Examiner*—Christopher C. Grant
*Attorney, Agent, or Firm*—Volpe and Koenig, P.C.

[57] ABSTRACT

The cable television digital audio system of the present invention provides seamless reception and integration of analog video and audio programs and digital audio programs. The system comprises a settop terminal with a digital audio module for receiving an RF modulated digital data stream. The settop terminal permits the simultaneous reception of analog video and audio broadcasts and digital audio broadcasts. The digital audio module may include a separate frequency agile RF tuner enabling both the settop terminal and digital audio module to be tuned to and reproduce separate programs. A television monitor receiver displays normal video programming from the settop terminal and also provides on-screen display (OSD) of channel selection and program information.

25 Claims, 6 Drawing Sheets

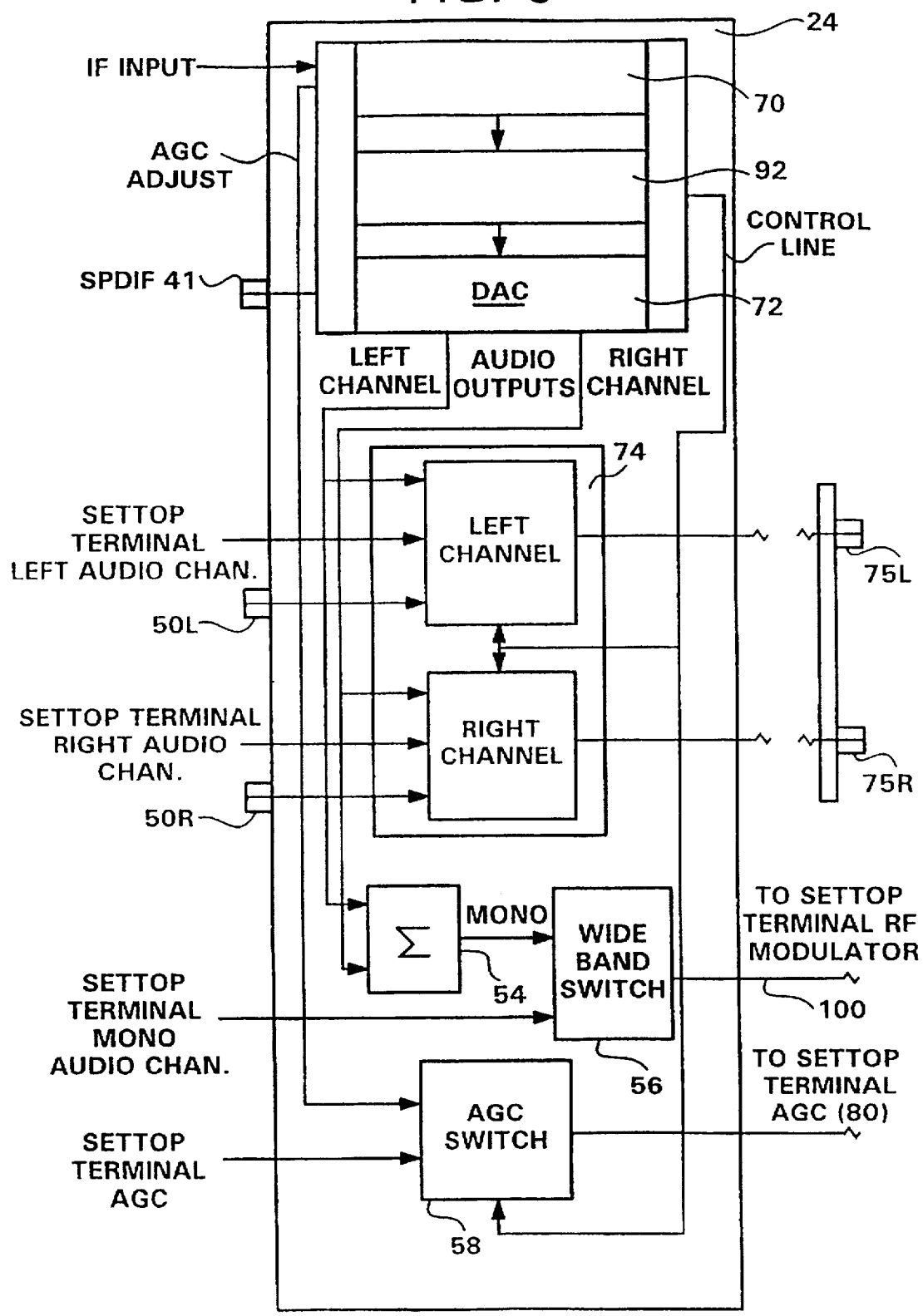

SYSTEM FOR INTEGRATING DIGITAL AUDIO AND ANALOG VIDEO TO PROVIDE SEAMLESS USER TRANSPARENT FEATURES

BACKGROUND OF THE INVENTION

1. Field of the Invention

This invention relates generally to cable television communication systems. More specifically, the invention relates to a cable television settop terminal with digital cable audio functionality.

2. Description Of Related Art

Many of today's television networks broadcast the audio portion of their telecasts as multichannel television sound (MTS), which provides broadcast stereo television (BTSC), and also a second program audio (SAP) which is used for second language audio. The frequency response of the originating stereo broadcast is typically 500-15,000 Hz with a dynamic range of approximately 60 dB.

The method used by broadcast television networks to provide MTS audio to the television channel incorporates a BTSC stereo generator in which the video and baseband BTSC audio outputs are modulated, placing the double-sided suppressed carrier BTSC audio on a 4.5 MHz standard subcarrier. However, for the MTS system, both the left and right stereo channels and the SAP channel must have their audio baseband signal companded. Companding compresses the dynamic range of the audio signal during transmission, then expands the signal at the receiver to restore the original dynamic range. However, such techniques inevitably introduce noise and distortion into the original stereo program, and reduce channel separation. Stereo audio is available through many of today's televisions and VCRs (video cassette recorders) since these devices are BTSC compatible.

More recent audio techniques digitize the analog audio waveform to increase the dynamic range of reproduced music. Accordingly, dynamic range is increased up to 92 dB and a flat frequency response from 20-22,000 Hz with virtually no noise is achieved.

One solution to overcome the limitations imposed by cable transmission bandwidth and the resultant signal degradation experienced by analog audio sources is to broadcast and receive digitally recorded sources in the digital domain. After reception, the digital data is then converted to analog, preserving virtually all of the musical information present during recording. To date, this technology has been used in a limited extent by cable television providers. Cable television providers currently broadcast digital audio-only services to their subscribers. These services provide commercial-free continuous musical selections in a broad range of musical styles and categories. In addition to the digital data comprising the musical content, information pertaining to program identification is also included for selection and display.

The current digital audio services provided by cable operators, however, have drawbacks. To receive these services, a separate digital audio converter is required. The separate converter demodulates digital audio signals and provides conventional audio outputs to external sound amplifying devices such as a stereo system. The digital audio converter is typically controlled separately from the video controls without coordination between analog video sources and analog or digital audio sources. This results in an awkward control arrangement between both video and audio converters. Furthermore, the music program identification information is usually displayed on a small liquid crystal display rather than in a convenient and user-friendly arrangement such as an on-screen display. Such a system is described in U.S. Pat. Nos. 5,282,028 and 5,239,540.

Accordingly, there exists a need for a seamless integration between received analog video and audio, and received digital audio using one settop terminal.

SUMMARY OF THE INVENTION

The cable television digital audio system of the present invention provides seamless reception and integration of analog video and audio programs and digital audio programs. The system comprises a settop terminal with a digital audio module for receiving an RF modulated digital data stream. The settop terminal permits the simultaneous reception of analog video and audio broadcasts and digital audio broadcasts. The digital audio module may include a separate frequency agile RF tuner enabling both the settop terminal and digital audio module to be tuned to and reproduce separate programs. A television monitor receiver displays normal video programming from the settop terminal and also provides on-screen display (OSD) of channel selection and program information. Optional audio outputs from the settop terminal connect the received digital audio source to an external, conventional stereo system for amplification and reproduction.

Accordingly, it is an object of the present invention to provide the seamless integration of cable television analog video and digital audio from one settop terminal.

It is another object of the present invention to use one remote control to select video and digital audio programs and all associated settop terminal options.

BRIEF DESCRIPTION OF THE DRAWINGS

FIG. 5 is a detailed block diagram of the digital audio module.

DETAILED DESCRIPTION OF THE PREFERRED EMBODIMENT

Figure 1:
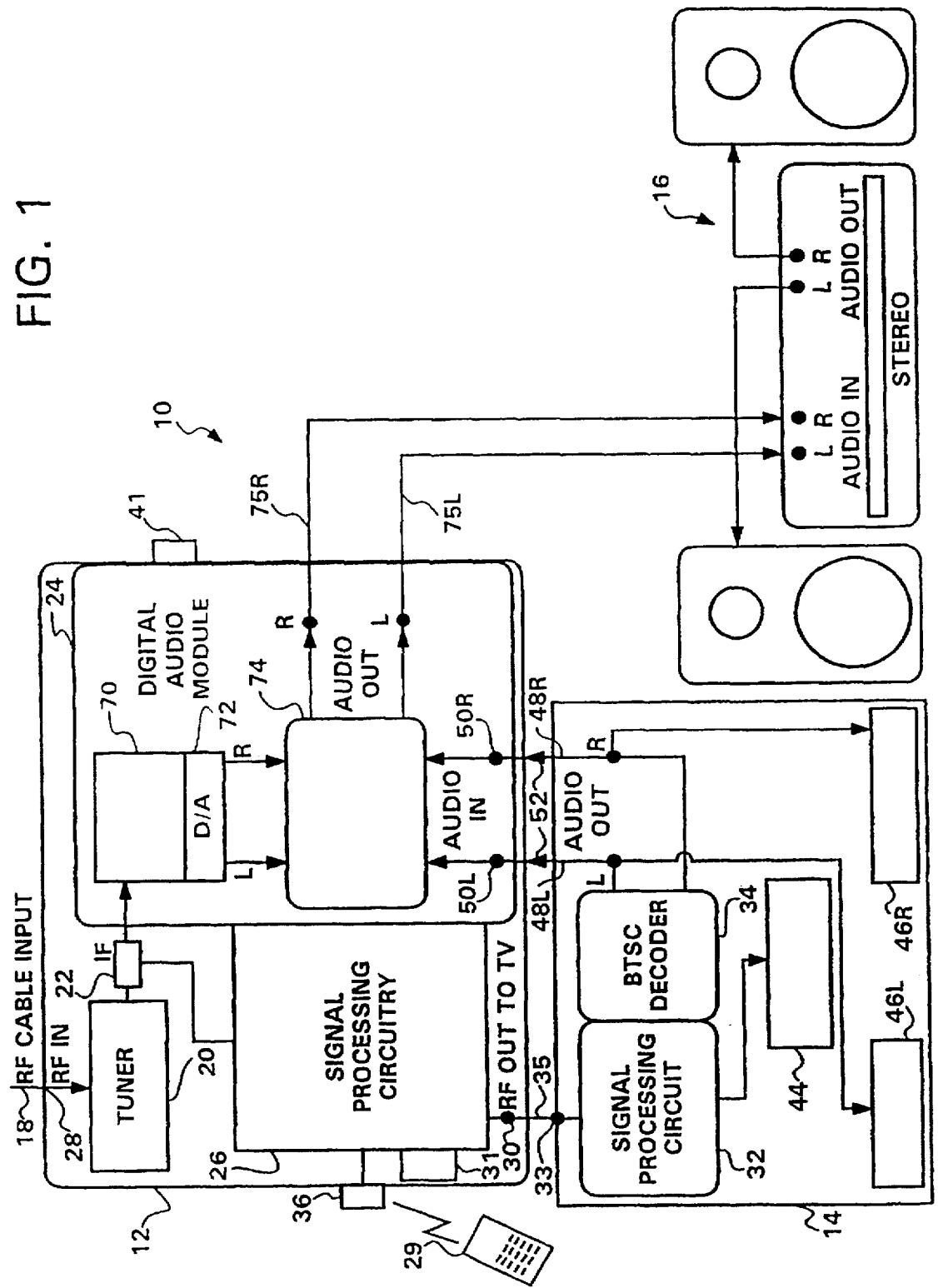
FIG. 1 is a block diagram of the preferred embodiment of settop terminal system of the present invention.

The preferred embodiment will be described with reference to the drawing figures where like numerals represent like elements throughout.

The preferred embodiment of the present invention is shown in FIG. 1. A tunable, settop terminal 12 simultaneously receives analog video with analog audio and digital audio signals and provides seamless switching between formats. This is achieved by integrating an analog video and audio settop terminal with an integral digital audio module. Referring to FIG. 1, a typical CATV subscriber installation 10 includes a settop terminal 12, a television monitor receiver 14 and a stereo system 16. The settop terminal 12 is controlled by using either navigation keys 36 located on the front of the unit or a remote control 29. The settop terminal 12 is coupled to the CATV network via a coaxial cable drop line 18 brought into a subscriber's home and terminated at a CATV RF input 28.

The CATV operator typically provides an array of broadcast and interactive services including analog video with analog audio and digital audio programming. These services are transmitted on a plurality of 6 MHz channels to the subscriber over the full bandwidth of the CATV network, which may be up to 1 GHz. A received CATV signal comprises an RF carrier signal which carries analog video, analog audio or digital audio with program information. Although the drop line 18 is typically connected to a conventional fiber-coax CATV network, the drop line 18 may be connected to a microwave antenna or means other than a direct connection to the settop terminal 12 to receive "wireless cable" programming.

The settop terminal 12 includes a frequency agile broadband tuner 20, which is selectively tuned to specific CATV channels. The audio and video output from the tuner 20 is demodulated and forwarded on an intermediate frequency (IF) carrier to an IF buffer 22. The IF buffer 22 output is input to a digital audio module 24 and signal processing circuitry 26.

Figure 2:
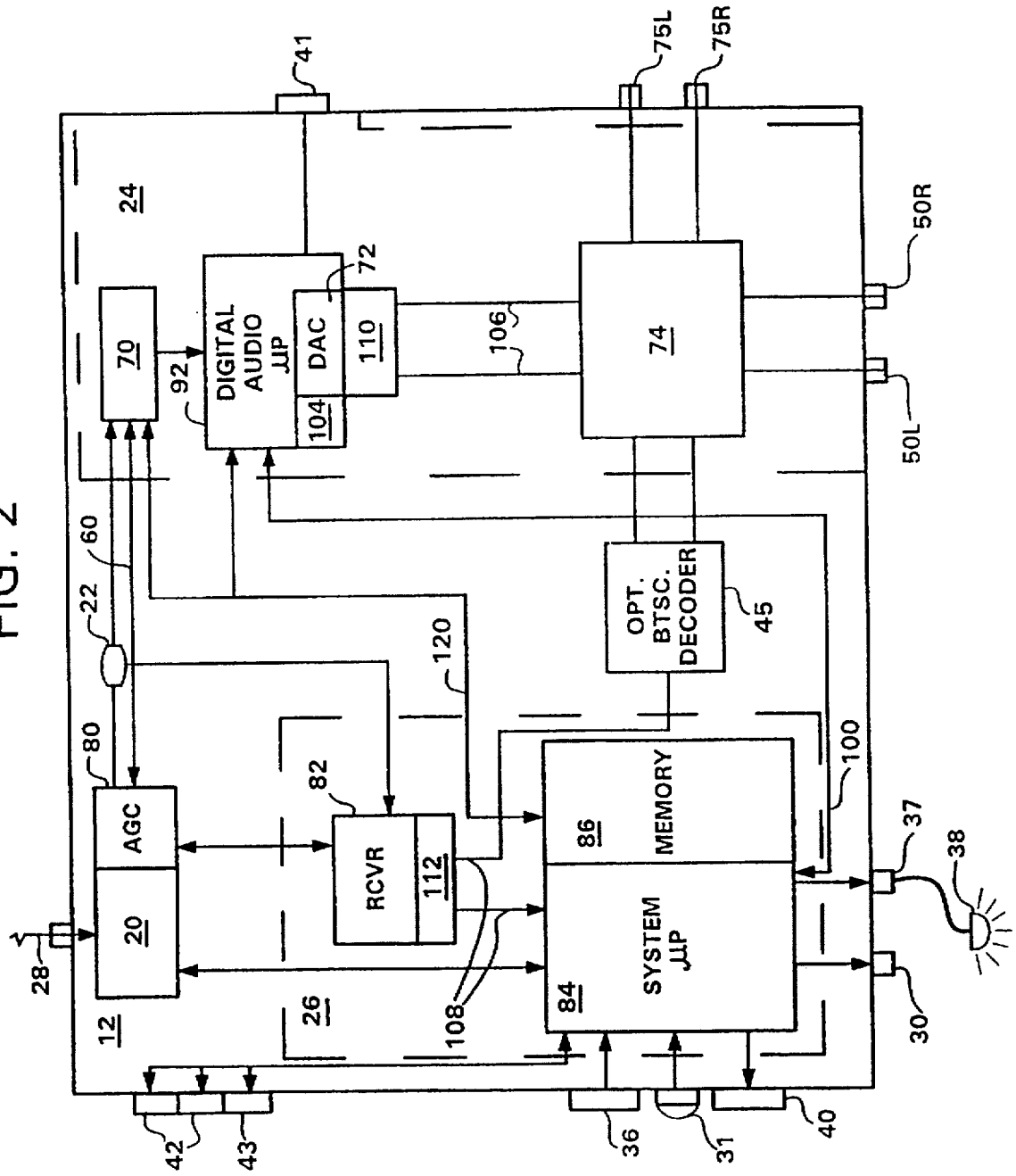
FIG. 2 is a detailed block diagram of the settop terminal with digital audio module.

A serial communication output from the tuner 20 establishes a link between the tuner 20 and settop terminal 12 processing circuitry 26. The processor 26 oversees all of the functions associated with conventional CATV settop terminals including processing of analog audio-video (A/V) signals, OSD video generation capabilities, signal scrambling detection, signal descrambling, subscriber authorization and subscriber interface via the infrared (IR) remote controller 29 and receiver 31. Baseband A/V signals are output by the processor 26 to the television monitor receiver 14 via an RF output 30, a coaxial line 35 and an RF input 33. Although the receiver 14 is shown as a television monitor receiver 14, the receiver 14 may comprise a video cassette recorder or any other type of cable-ready device which accepts an RF input signal and provides a BTSC decoded stereo baseband audio output. In the case where an external BTSC decoder is not available, an optional BTSC decoder can be installed within the settop terminal 12. As shown in FIG. 2, the optional BTSC decoder 45 would couple the audio output from the analog receiver 82 to an input of a audio selector switch 74.

The baseband A/V signals are separated and processed by the television monitor receiver 14 signal processing circuitry 32. Analog video output is then provided to a monitor 44. Stereo analog audio output, decoded by a BTSC decoder 34, is amplified and reproduced by a pair of speakers 46L, 46R. Accordingly, a subscriber will be able to view a selected analog video program and listen to the associated analog audio program. A detailed discussion of the television signal processing circuitry 32 and the BTSC decoder 34, which are well known to those skilled in the art, is outside the scope of this description.

In the preferred embodiment, the BTSC decoder 34 also outputs a stereo analog audio signal to outputs 48L, 48R, through a shielded cable 52 to audio inputs 50L, 50R of the settop terminal 12.

A narrowband digital receiver 70 within the digital audio module 24 receives the IF signal from the tuner 20 and the digital audio information within the signal is processed to provide a CD-quality audio output. As will be described in detail hereinafter, the digital audio module 24 provides three audio outputs: 1) an attenuable baseband stereo output to the stereo system 16; 2) an attenuable monaural sum of the baseband stereo output for RF output to the television monitor receiver 14, and 3) an attenuable stereo digital audio output using the industry standard Sony-Philips digital interface format (SPDIF) 41.

The settop terminal 12 is shown in greater detail in FIG. 2. The tuner 20, coupled to the CATV input 28, tunes to the carrier frequency of the channel selected by the subscriber. The tuner 20 removes the carrier frequency and amplifies the resulting A/V signal. The gain is controlled via an automatic gain control (AGC) 80 so that the output of the tuner 20 remains essentially constant despite variations in CATV signal strength.

The received A/V signal is output from the tuner 20 on an IF carrier to the IF buffer 22, which splits the signal for separate digital and analog processing by the digital audio module 24 and the analog signal processing circuitry 26, respectively.

With respect to analog processing of the A/V signal, the signal is processed in a conventional manner which will be briefly described. The signal is received by an analog receiver 82 which removes the IF carrier. The analog receiver 82 monitors the incoming signal and controls the AGC 80 to ensure that the A/V signal output from the tuner 20 is within allowable limits.

Using programmable integrated circuits, the microprocessor 84, with associated memory 86, detects whether the signals are scrambled, determines whether the subscriber is authorized to receive the requested service and descrambles the received signals. A scramble detection module determines whether the technique used to scramble the A/V signal is a technique supported by the descrambling module. An authorization module determines whether the subscriber is authorized to receive the scrambled services that have been selected. Authorization information, such as a subscriber address identifier, is detected on the specific channel being monitored by the microprocessor 84. This information is compared to an authorization code stored within the memory of the processor 26 to determine if the subscriber is an authorized user. Alternatively, the authorization information may be provided on a separate dedicated control channel. If a subscriber is authorized, the descrambling module descrambles the A/V signal.

The resulting baseband A/V signal is modulated and output on a second carrier frequency, typically corresponding to television VHF channel 3 or 4, for RF input into the television monitor receiver 14. The television signal processing circuitry 32 includes a tuner which is selectively tuned to the RF carrier output from the settop terminal 12.

In the preferred embodiment, channel selection, volume control and other subscriber commands are input to the settop terminal 12 via an IR remote controller 29 and IR receiver 31 or via navigation keys 36. If a new channel is selected, the microprocessor 84, in turn, tunes the tuner 20 to the new RF frequency. Confirmation of subscriber commands and service option menus are output to the television monitor receiver 14 for on-screen display. The on-board LED display 40 provides limited indication of mode and channel selection. A detailed discussion of the graphical user interface (GUI), which is well known in the art, is outside the scope of this invention.

With respect to digital processing of the A/V signal, the signal output from the IF buffer 22 is received by a narrowband digital data receiver 70 which removes the IF carrier. The digital receiver 70 monitors the incoming signals to ensure that the A/V signal output from the tuner 20 is within allowable limits. Since the digital data receiver 70 and the analog receiver 82 operate on completely different frequency bandwidths, each receiver 82, 70 has its own circuitry which controls the AGC 80. An AGC switch 58 as shown in FIG. 2 connects either the analog receiver 82 adjustment circuitry or the digital receiver 70 adjustment circuitry to the control input of AGC 80. Accordingly, the system microprocessor 84 and digital audio module microprocessor 92, monitor the incoming RF signal and activate the AGC switch 58 to present the correct adjustment circuitry via line 60 to the tuner 20 and AGC 80 based on the type of signal (i.e. analog or digital) being received.

The digital audio module 24 further comprises a digital processor 92 and a digital-to-analog convertor (DAC) 72. As is well known in the art, the digital processor 92 demodulates and processes the A/V signal from the digital receiver 70 to produce a data stream containing the stereo pair of digital audio data plus program content information. As shown in greater detail in FIG. 5, the digital stereo signals are converted by the DAC 72 to analog which provide a first input to the audio selector switch 74. A second input to the audio selector switch 74, as discussed above, is provided from the external BTSC decoder 34. A third input to the audio selector switch 74 is from the analog receiver 82 if an optional BTSC decoder has been installed. The selector switch 74 normally outputs the audio signal from the external BTSC decoder 34. However, when a channel that contains digital music is chosen, system microprocessor 84 communicates with digital microprocessor 92 and changes the state of selector switch 74 to present the audio output from the DAC 72 to the output of the audio switch 74. The output from the audio selector switch 74 is output to the stereo system 16.

A direct digital audio output 41 is available for those stereo system components that have a compatible SPDIF input. The digital audio module 24 also provides a monaural signal of the stereo output through summer 54 over the application audio output 100 to the settop terminal 12 signal processing circuitry 26. Since the analog receiver 82 provides audio in the form either a monaural signal or a BTSC encoded signal, the monaural signal is switched via the wideband switch 56 with the digital monaural output to the settop terminal 12 signal processing circuitry 26. If a digital audio program is available, digital audio microprocessor 92 activates the wideband switch 56 to present the digital monaural signal to the signal processing circuitry 26. The monaural audio is modulated with the video content of the program and input to the television monitor receiver 14 via the RF input port 33. If the audio outputs 75L, 75R are not connected to the stereo system 16 for stereophonic reproduction, a digital monaural program will be reproduced by the television monitor receiver 14.

The settop terminal 12 has also been designed with an automated testing capability utilizing two industry standard RS-232 serial communication ports 42 and one communication port 43 as connections to the system. The test system interrogates and exercises the terminal through all of the various modes of operation while simultaneously monitoring all inputs and outputs. The main purpose of the automated test is to reduce the testing time of all the audio and video parameters and insure that all operating specifications are within tolerance.

As described above, the audio output of the settop terminal 12 can be derived from either CATV digital audio or CATV analog audio. In order for operation to appear seamless to the subscriber, switching from one audio source to another must be controlled to ensure that the source levels (i.e., volume) are closely matched, otherwise an abrupt transition will occur. A drastic difference in volume between two sources could startle a subscriber listening to the audio program and potentially damage the stereo system 16. A monitoring means 104 ensures that the audio source remains transparent to the subscriber by equalizing the relative source levels of the digital and analog paths 106, 108. The digital audio source 106 level will be held consistent with the video analog audio source 108 level by adjusting amplifiers 110, 112 at the output of the sources 106, 108. Any changes to the analog source 108 level will affect the digital source 106 level. As a result, as the subscriber switches between digital audio and video sources 106, 108, the source levels will remain consistent.

Since the digital audio source 106 has a wider dynamic range than the analog audio source 108, the volume level of the digital source 106, may be increased beyond the maximum level of the analog audio source 108. This permits the full digital audio dynamic range to be utilized. Accordingly, the digital audio source 106 level will be maintained until the analog audio mode is re-entered, at which time, the digital audio source 106 level will be reset to the analog audio source 108 level.

The audio output selector feature of the present invention permits transparent selection of the digital audio source 106 or the BTSC decoded stereo audio source 108. This feature supports two intended uses. First, in the case where the subscriber has access to an external BTSC decoder 34, such as in the television monitor receiver 14, the outputs from the BTSC decoder 34 may be routed to the stereo system 16. This permits the subscriber to listen to the stereo system 16 output for any selected video programming. If the video programming includes a digital audio program, the in-band stereo digital audio source 106 is selected for presentation to the baseband stereo outputs 75L, 75R of the settop terminal 12 as shown in the table below. If the selected video program does not include a digital audio program, the BTSC decoded stereo audio source 108 is selected. In either case, baseband stereo outputs 75L, 75R are always presented by the settop terminal 12 to the stereo system 16. The second use of the audio selector feature permits a second audio source, such as a CD player, to be input. This is useful when the digital audio module 24 has displaced the CD player in the stereo system 16 or if the optional BTSC decoder is installed and the external audio inputs 50L, 50R are not used. When the settop terminal 12 is not in use, the audio output selector switch 74 defaults to the external input position.

The selection of either the digital audio source 106 or the BTSC decoded source 108 is transparently made by the settop terminal 12 and requires no subscriber intervention. The RF audio output 30 to the television monitor receiver 14 will source either a monaural sum of the digital audio stereo signals or the standard BTSC encoded audio when digital audio programming is unavailable.

As shown in FIG. 3, the preferred embodiment of the present invention supports three different modes of operation: 1) standard video mode 120; 2) standard Music Choice mode 122; and 3) secure digital audio mode 124. After the television monitor receiver 14, the stereo system 16 and the settop terminal 12 have been turned-on, (steps 150, 152, 154), the subscriber tunes to the desired channel (step 156). For the standard video mode 120, the subscriber selects a video channel wherein no digital audio programming is available (step 158). An A/V RF signal will be output to the television monitor receiver 14 (step 160) and a BTSC decoded audio signal will be reproduced by the television speakers 46L, 46R (step 162). The subscriber may also listen to the audio program via the stereo system 16. In this case, the audio selector switch 74 within the settop terminal 12 will output the BTSC decoded audio source 108 to the stereo system 16 (step 164). The subscriber then adjusts the audio level at the television monitor receiver 14, the stereo system 16, or via remote control 29 to the desired levels (step 166).

In the secure digital audio mode 124, the subscriber selects a video channel (step 156) wherein an associated digital audio program is available (step 158). The secure digital audio mode 124 effectively replaces the standard analog audio associated with a video channel with in-band digital audio. In addition to providing much greater security, the secure digital audio mode 124 also provides CD-quality sound. In this case, the audio selector switch 74 will switch to the digital source 106 (step 168) and will output the stereo signals from the digital source 106 to the stereo system 16 (step 172). The settop terminal 12 will output the video RF signal to the television monitor receiver 14 for viewing by the subscriber (step 170). The subscriber may then adjust the audio at the stereo systems 16, or via remote control 29 to the desired level (step 174).

In the Music Choice mode 122, the settop terminal 12 must be tuned to a music channel (step 156). The Music Choice mode provides thirty-plus channels of commercial-free, CD-quality music programming that caters to practically all individual musical preferences. The audio selector switch 74 will switch to the digital source 106 (step 176) and will output the stereo signals from the digital source 106 to the stereo system 16 (step 180). The settop terminal 12 will output the video RF signal to the television monitor receiver 14 for viewing by the subscriber (step 178). The subscriber may then adjust the audio at the stereo 16, or via remote control 29 to the desired level (step 182).

Table 1 summarizes the available modes, hardware, and audio sources which are presented to the TV audio output 30 (RF audio) and baseband (L/R Out) audio output ports 75L, 75R, and how both volume and mute are controlled.

TABLE 1

|  | Standard Video Mode 120 | Standard Music Choice (MC) Mode 122 | Secure Digital Audio Mode 124 | Simulcast Mode |
| --- | --- | --- | --- | --- |
| Hardware Required | Standard settop terminal 12 w/Digital Audio Module | Standard settop terminal 12 w/Digital Audio Module | Standard settop terminal 12 w/Digital Audio Module | Standard settop terminal 12 w/Digital Audio Tuner Module |
| TV Monitor Audio (RF Modulated Audio) | Standard TV Audio (settop terminal mono or BTSC stereo) | Digital Audio Mono (Music Choice mono audio) | Digital Audio Mono (Secure Channel mono audio) | Standard TV Audio (settop terminal mono or BTSC stereo) |
| Settop Terminal Baseband Audio Output (L/R) | Standard TV Audio (Settop terminal mono on both L and R or BTSC L/R stereo if equipped with optional BTSC decoder or if inputs connect to an external BTSC decoder) | Digital Audio Stereo (Music Choice Stereo) | Digital Audio Stereo (Secure Channel Stereo) | Digital Audio Stereo (simulcast stereo programming in Simulcast Mode; Music Choice programming) |
| Settop Terminal Volume Control | Volume up/down controls both TV and baseband audio | Volume up/down controls both TV and baseband audio | Volume up/down controls both TV and baseband audio | Volume up/down controls both TV and baseband audio |
| Settop Terminal Mute Control | Mute function controls both TV and baseband audio | Mute function controls both TV and baseband audio | Mute function controls both TV and baseband audio | Mute function controls both TV and baseband audio |

Figure 4:
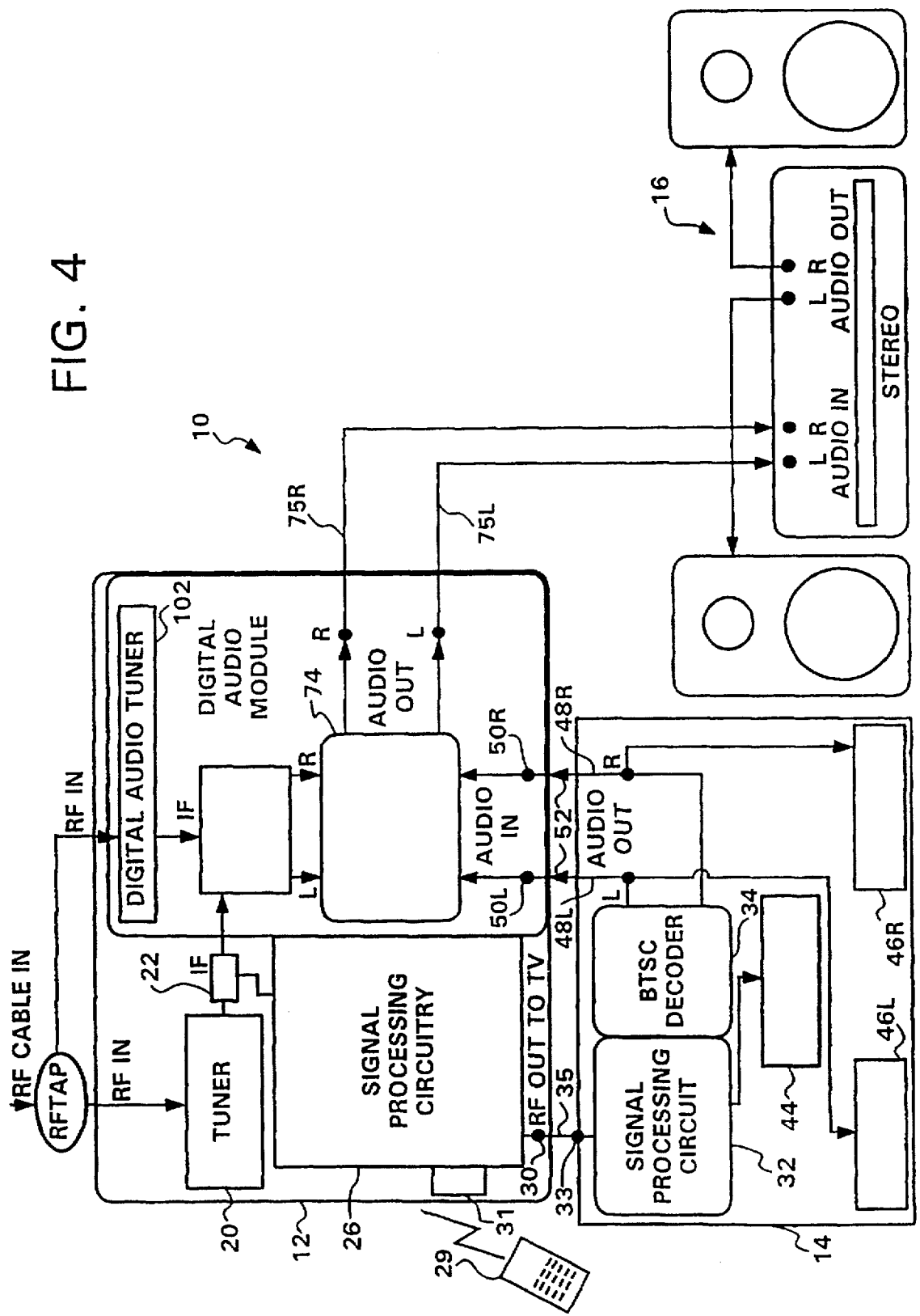
FIG. 4 is a block diagram of an alternative embodiment.

In an alternative embodiment, shown in FIG. 4, the digital audio module 24 is equipped with its own wideband RF tuner 102. This allows for the simultaneous tuning of an analog video channel using video tuner 20 and a digital audio tuner 102. In this case, the digital microprocessor 92 can control either the RF tuner 20 in the settop terminal 12, or its own tuner 102. The currently running application determines which processor becomes master and slave. When a music application is in use, the video microprocessor 84 becomes subservient to the digital audio microprocessor 92.

The wide-band RF tuner 102 may be used to either receive digital audio simulcast channels, such as HBO, Cinemax, or Showtime, during a video broadcast or to receive Music Choice programming at the same time that a standard BTSC video program is being received using the main tuner 20. When entering a video channel that is a simulcast event, the video microprocessor 84 and digital audio microprocessor 92 recognize the broadcast and seamlessly switch the digital audio tuner 102 to the simulcast audio channel adjusting the video and audio level gains as previously discussed. This operation is totally transparent to the subscriber. The BTSC audio program that normally accompanies the video program is presented to the television monitor receiver 14 while the digital channel is output to the stereo system 16.

This embodiment also permits the subscriber to mute the normal audio associated with a video channel and, for example, listen to Music Choice mode programming while watching a sporting event. When watching video programming and listening to Music Choice mode programming concurrently, the RF audio output to the television monitor receiver 14 will carry the audio associated with the video programming. In addition, it also permits one subscriber to view and listen to normal video programming while another subscriber listens to Music Choice mode either in another room or using headphones in the same room.

In this alternative embodiment, the subscriber may be required to control two tuners using the same remote or settop terminal controls. The settop terminal 12 provides individual tuner controls (volume, mute, channel up/down) via the remote control 29 or the navigation keys 36 by selecting the applicable tuner prior to making adjustments.

The settop terminal 12 also permits a user to program the settop terminal to automatically tape an audio channel, at a specific time, onto video tape. Accordingly, both an audio program and the associated video song identification information may be recorded onto the video tape. This is a new capability not available in previous settop terminals or audio products and directly results from the integration of audio and video in one product. This feature is enabled by the system microprocessor 84 programmable timer function that switches the settop terminal 12 to a pre-arranged channel and initiates a programmed sequence of VCR 15 instructions, such as "power" and "record" for the programmed period of time, then "stop" and "power" (off). The VCR timer program steps are input into the system memory 86 via the on-screen display. This feature is communicated to the VCR 15 via an IR blaster output 37 and optical transmitter 38 that beam the coded transmission to the VCR 15. An IR blaster 37 database, known to those skilled in the art, is contained in the firmware EEPROM.

While the present invention has been described in terms of the preferred embodiment, other variations which are within the scope of the invention as outlined in the claims below will be apparent to those skilled in the art.

We claim:

1. An apparatus for a cable or wireless television digital information system providing seamless reception and integration of digital audio broadcasts along with analog video broadcasts comprising:
   a tuner for selectively receiving a radio frequency transmission on a channel which may include digital audio, analog video with analog audio, or analog video with digital audio information;
   said tuner converting said radio frequency transmission into digital audio and analog information signals received on said selected channel;
   an analog audio and video processor coupled to said tuner for outputting said analog information signal to a television monitor receiver via an analog information signal output;
   a digital audio module having a digital audio module processor coupled to said tuner for receiving said digital audio signal from said tuner;
   said digital audio module processor processing said digital audio signal into digital audio program signals and digital program content information signals;
   means for combining said digital program content information signals with the analog information signal output; and
   an output for said digital program signals.

2. The apparatus of claim 1 further including means for detecting the level of said analog information signal and said digital audio program and means for equalizing said levels.

3. The apparatus of claim 1 further comprising an automatic gain control module for controlling an audio/video signal output level from said tuner.

4. The apparatus of claim 3 wherein said automatic gain control module is selectively controlled by said analog processor and said digital processor depending upon the type of information signals received.

5. The apparatus of claim 1 wherein said digital module further includes audio inputs for receiving externally decoded BTSC stereo signals.

6. The apparatus of claim 5 further comprising a selector switch having a first and a second input and an output wherein said first input accepts said externally decoded BTSC stereo signals, said second input accepts said digital program signals and said output is presented to a stereo system.

7. The apparatus of claim 6 further comprising a BTSC decoder and wherein said switch further includes a third input to accept a BTSC decoded audio input.

8. The apparatus of claim 1 wherein said analog processor further comprises means for inputting commands from a subscriber and means for outputting information for display on a television monitor receiver.

9. The apparatus of claim 1 further comprising means for displaying said digital program content information on said television monitor receiver.

10. An apparatus for a cable or wireless television digital information system providing seamless reception and integration of digital audio broadcasts along with analog video broadcasts comprising:
    a first tuner for receiving a radio frequency transmission on a first selected channel which may include digital audio, analog video with analog audio, or analog video with digital audio information;
    said first tuner converting said radio frequency transmission into digital and analog information signals received on said first selected channel;
    an analog audio and video processor coupled to said first tuner for outputting said analog information signal to a television monitor receiver via an analog information signal output;
    a digital audio module having a second tuner for receiving a radio frequency transmission on a second selected channel which may include digital audio signal, analog video with analog audio, or analog video with digital audio channels and a digital audio module processor coupled to said second tuner for receiving said digital audio signal from said second tuner;
    said digital audio module processor processing said digital audio signal into digital audio program signals and/or digital program content information signals dependant upon the type of information received on said second selected channel;
    means for combining said digital program content information signals with analog information signal output; and
    an output for said digital program signals.

11. The apparatus of claim 10 further including means for detecting the level of said analog information signal and said digital audio program and means for equalizing said levels.

12. The apparatus of claim 10 further comprising an automatic gain control module for controlling an audio/video signal output level from said tuner.

13. The apparatus of claim 12 wherein said automatic gain control module is selectively controlled by said analog processor and said digital processor depending upon the type of information signals received.

14. The apparatus of claim 10 wherein said digital module further includes audio inputs for receiving externally decoded BTSC stereo signals.

15. The apparatus of claim 14 further comprising a selector switch having a first and a second input and an output wherein said first input accepts said externally decoded BTSC stereo signals, said second input accepts said digital program signals and said output is presented to a stereo system.

16. The apparatus of claim 15 further comprising a BTSC decoder and wherein said switch further includes a third input to accept a BTSC decoded audio input.

17. The apparatus of claim 10 wherein said analog processor further comprises means for inputting commands from a subscriber and means for outputting information for display on a television monitor receiver.

18. The apparatus of claim 10 further comprising means for displaying said digital program content information on said television monitor receiver.

19. An apparatus for providing seamless reception and integration of digital information broadcasts along with analog video broadcasts in a cable or wireless television system comprising:

a tuner for receiving a selected radio frequency transmission that selectively includes digital data, digital audio, analog video data, analog audio data, or combinations thereof and outputs a responsive signal;

said tuner converting said radio frequency transmission into digital and analog information signals received on said selected channel;

an analog audio and video processor coupled to said tuner for outputting said analog information signal to a television monitor receiver via an analog information signal output;

a digital module processor coupled to said tuner for receiving digital information within the responsive signal from said tuner;

said digital module processor processing said digital information signal into digital program or content signals dependant upon the digital information received on said selected frequency;

means for detecting the level of said analog information signal and said digital program and means for equalizing said levels; and means for combining said digital program or content signals with associated analog information signal output.

20. The apparatus of claim 19 further comprising an automatic gain control module for controlling an audio/video signal output level from said tuner.

21. The apparatus of claim 20 wherein said automatic gain control module is selectively controlled by said analog processor and said digital processor depending upon the type of information signals received.

22. The apparatus of claim 19 wherein said digital module further includes input ports for receiving externally decoded BTSC stereo signals.

23. The apparatus of claim 22 further comprising a selector switch having a first and a second input and an output wherein said first input accepts said external signals, said second input accepts said digital program signals and said output is presented to an external device.

24. The apparatus of claim 19 wherein said analog audio and video processor further comprises means for inputting commands from a subscriber and means for outputting information for display on a television monitor receiver.

25. The apparatus of claim 19 further comprising means for displaying said digital program content information on said television monitor receiver.

* * * * *

UNITED STATES PATENT AND TRADEMARK OFFICE
CERTIFICATE OF CORRECTION

PATENT NO. : 5,796,423

DATED : 8/18/98

INVENTOR(S) : Robbins et al.

Figure 3A:
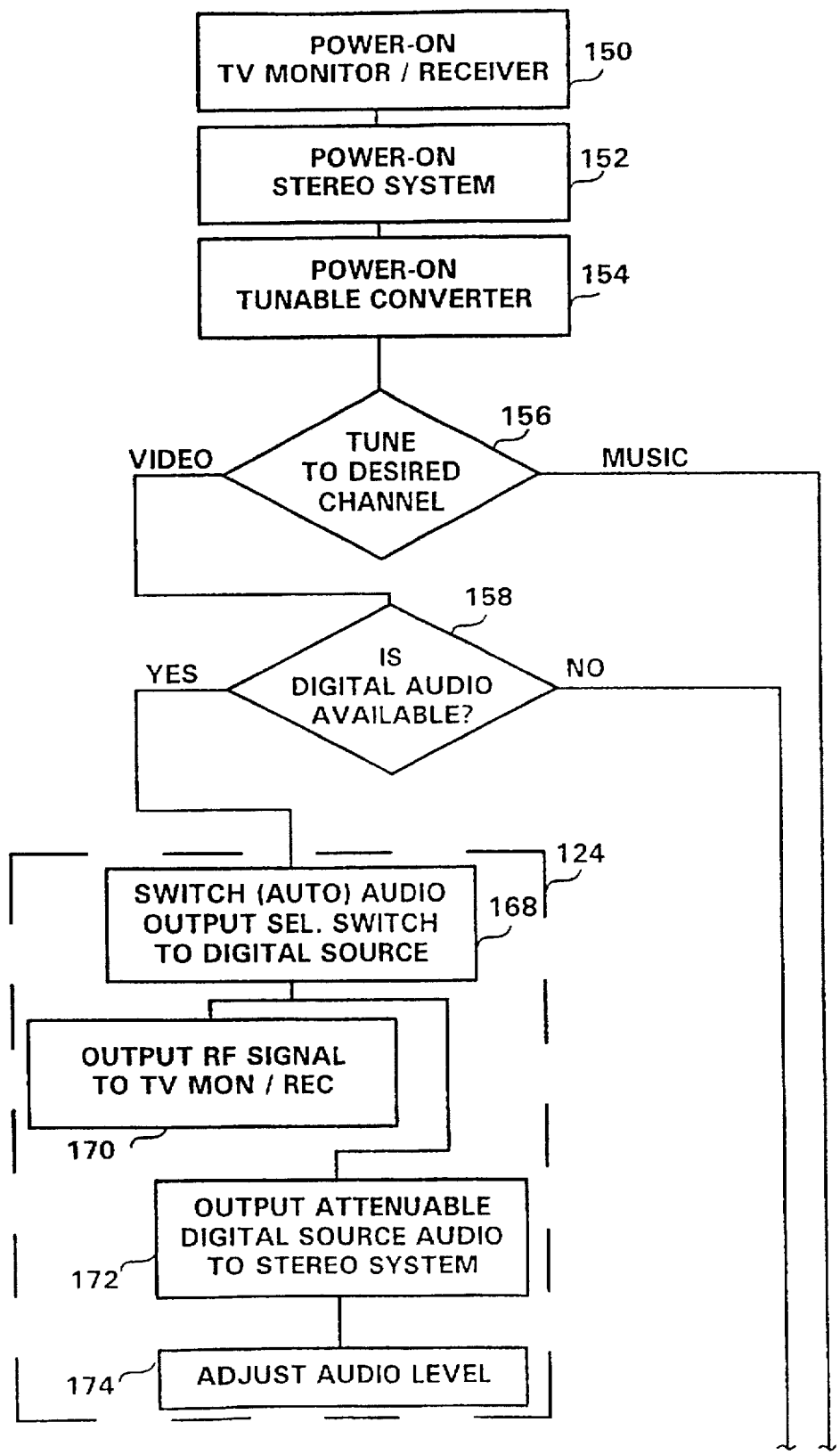
FIG. 3 is a flow chart of the video/digital audio programming selection process.
Figure 3B:
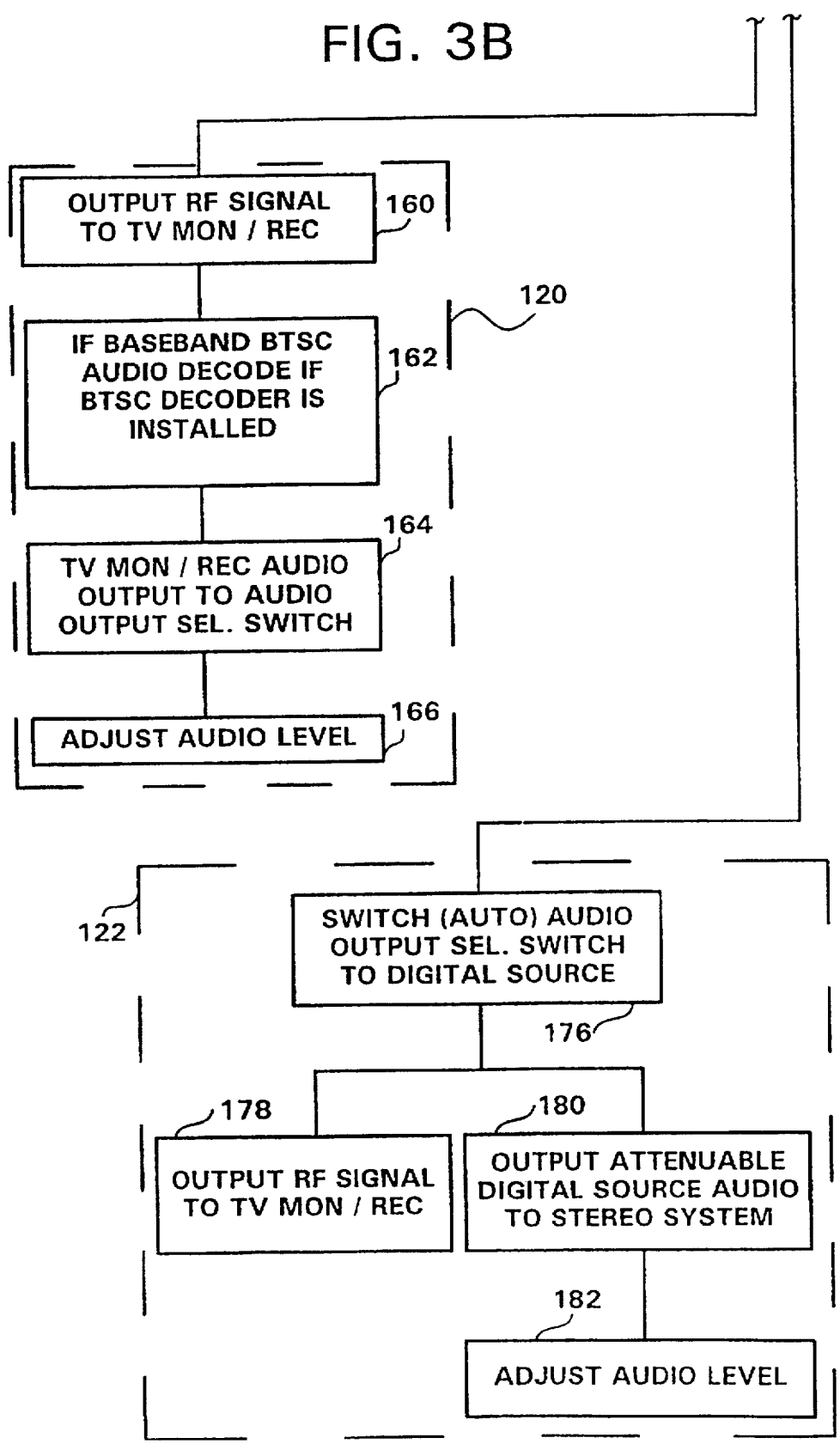

It is certified that error appears in the above-identified patent and that said Letters Patent is hereby corrected as shown below:

Column 2, line 42, delete "Figure 3 is a flow chart" and insert therefor --Figures 3A and 3B are flow charts--.

Column 6, line 49, delete "Figure 3" and insert therefor --Figures 3A and 3B--.

Signed and Sealed this

Twenty-third Day of February, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,796,423
DATED : August 18, 1998
INVENTOR(S) : Robbins et al.

It is certified that error appears in the above-indentified patent and that said Letters Patent is hereby corrected as shown below:

In column 4, line 67, delete "Figure 2", and insert therefor --Figure 5.--

Signed and Sealed this

Second Day of November, 1999

Attest:

Q. TODD DICKINSON

*Attesting Officer*    Acting Commissioner of Patents and Trademarks